United States Patent
Kelley et al.

(10) Patent No.: US 7,484,220 B2
(45) Date of Patent: Jan. 27, 2009

(54) METHOD, SOFTWARE AND APPARATUS FOR USING APPLICATION STATE HISTORY INFORMATION WHEN RE-LAUNCHING APPLICATIONS

(75) Inventors: Brian Harold Kelley, San Diego, CA (US); Robert Walker, San Diego, CA (US); Marc Edward Nijdam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 10/854,982

(22) Filed: May 26, 2004

(65) Prior Publication Data

US 2005/0268301 A1     Dec. 1, 2005

(51) Int. Cl.
    *G06F 3/00*     (2006.01)
    *G06F 11/00*     (2006.01)

(52) U.S. Cl. .................................... 719/318; 714/15

(58) Field of Classification Search .................. 714/15, 714/48, 49, 47; 715/500.1, 501, 513, 804, 715/234, 752, 760; 719/329, 318; 718/106; 709/201–207, 217–219; 370/29.07
See application file for complete search history.

(56) References Cited

U.S. PATENT DOCUMENTS

| | | | |
|---|---|---|---|
| 5,448,739 A * | 9/1995 | Jacobson .................... 719/320 |
| 6,670,974 B1 * | 12/2003 | Richard et al. ............. 715/855 |
| 6,917,963 B1 * | 7/2005 | Hipp et al. .................. 709/204 |
| 6,934,755 B1 * | 8/2005 | Saulpaugh et al. ......... 709/226 |
| 7,200,848 B1 * | 4/2007 | Slaughter et al. ........... 719/317 |
| 2002/0010850 A1 * | 1/2002 | Nelson et al. .............. 712/202 |
| 2003/0119562 A1 * | 6/2003 | Kokubo ...................... 455/566 |
| 2005/0034124 A1 | 2/2005 | House et al. ................ 718/100 |
| 2005/0102675 A1 | 5/2005 | Parkyn ....................... 718/102 |

* cited by examiner

*Primary Examiner*—Meng-Ai An
*Assistant Examiner*—Charles E Anya
(74) *Attorney, Agent, or Firm*—James T. Hagler; Robert J. O' Connell; Thomas Rouse

(57) ABSTRACT

A system for saving application state history information, containing an historical snap-shot of dynamic application state information associated with execution of a first application on a computing device. The application state history information is saved for use in a subsequent re-launch of the first application.

12 Claims, 7 Drawing Sheets

METHOD, SOFTWARE AND APPARATUS FOR USING APPLICATION STATE HISTORY INFORMATION WHEN RE-LAUNCHING APPLICATIONS

BACKGROUND

1. Field

The present invention relates generally to the re-launching of software application, and more specifically, to the controlled re-launching of multiple software applications.

2. Background

Advances in technology have resulted in smaller and more powerful personal computing devices. For example, there currently exist a variety of portable wireless telephones, personal digital assistants (PDAs), and paging devices that are small, lightweight, and can be easily carried by users. Typically, these devices are severely resource constrained. For example, the screen size, amount of available memory and file system space, amount of input and output capabilities and processing capability may be each limited by the small size of the device.

Some devices or platforms allow only for a single instance of an application. In such cases, only one version of the application may be executing at any one time. This limits the number of instances that can be running at any one time. Thus, in response to an attempt to re-execute a currently running application that is restricted to one instance, either the current version of the application must be terminated and an new one initiated, or the request for the re-execution must be denied where the current executing version is allowed to continue execution.

Some devices are multiple frame and allow for the windowing of different applications as displayed to a user. Such devices do not typically restrict applications to a single instance. As such, as long as the application itself does not restrict itself to one instance, the device allows the system to allow for the execution of multiple instances of such application. In such systems, the simultaneous active state of at least two instances of any one particular application, requires all the system resources needed to keep each such application in a currently executing state. Other systems are single frame systems where only one application is considered to the current application, or in other words, only one application is considered to have current focus. The current application generally receives and provides all user input and output interaction. Typically, such systems are characterized by having only a single application visible on an associated display at any one point in time. When there is a traversal between the application considered the current application and a new application targeted to be the new current application, the new target application becomes the current application and such target application fills the corresponding frame.

Applications often have different modes where a mode defines what is visible in a given frame. Some applications may be initiated in any one of a number of modes (multimodal) while other applications may only be initiated in a single mode (single-modal). As such, a single-modal application always begins execution in the same single pre-defined state. That is, whenever, the application is launched the application displays the same user-interface (U/I) screen(s) to the user and provides the user with the same functional operation. For example, computer games are often designed to be of a single-modal type, and when launched, such applications display to the user the same start-up view of the game, typically a standard beginning point of the game. A multi-modal application, in contrast, is an application that can begin execution in any one of a multiple number of pre-defined states. As such, when such applications are launched, depending on the desired mode, such applications both display to the user the one particular desired mode and functionality of the application. For example, some email programs are designed as multi-modal applications where, for example, one mode is a "composition" mode, while, for example, another mode is a "reading new mail" mode. As such, when launched, the email program must be initiated to execute in one of the given modes.

When multi-modal applications are launched in a single-instance environment, as in any environment, such applications must begin execution in one of their given multiple modes. However, when the switch to a different mode is desired in a single instance environment, the multi-modal application must be re-launched to begin execution in the new mode. When re-launched, the previous mode information is lost and therefore cannot be retrieved upon any re-execution or re-launching of such application. As such, each of the different modes of the application must be presented as separate applications requiring consumption of their own memory, file systems, and the like. Therefore, even though the desired application may be executing before a switch between different modes, the same application must be re-executed as a separate application in the new mode. The process of shutting down and starting up applications each require significant use of the limited resources particularly in severely resource constrained devices.

Some applications are known to have multiple states where certain dynamic application state information may influence the usefulness of such application. Rather than application modes, such information may be referred to as user interface data information. Such user interface data information can include, for example, programs forward and back link information from browser applications which are useful to a user operating such applications. Where a browser is being used and a collection of forward and back links have been generated, and where then a new browser application is then executed from within the initial browser application, the operation within the new browser begins without any forward and backward links, and if the user wished to go to a previous link on the initial browser application, the user would not be presented with the option to perform such operation.

Applications that launch other applications typically have limited operational capabilities. For example, such systems do not provide for the back tracking (or re-launching) to a previously current application when an application called by the previously current application is terminated. Similarly, current systems do not provide for the passing of historical information for any re-launch of a previously current application. Currently, for example, in at least one email application, where the email application is currently executing as the current application in a "composition" mode, and while in such mode the device receives notification of the receipt of a new email message, a new email application is then executed where the new email displayed. In addition, in at least one email application, and under the same circumstances, the application, instead of executing the application in the new mode, instead keeps the current application as current and ignores the email notification message.

There is therefore a need in the art for a device or platform that supports re-launching of applications such that the re-launch includes the execution of the application using the same mode and/or state information associated with a previous launch of such application. There is also a need in the art for a device or platform that supports re-launching of multi-mode applications without the need to initiate any additional instances of the application.

SUMMARY

Embodiments disclosed herein address the above stated needs including, for example, one or more embodiments, in which methods, software and apparatus, are used to control and execute applications on a computing device including the saving of application state history information. The application state history information contains an historical snap-shot of dynamic application state information associated with execution of a first application. Further, such saved application state history information is saved for subsequent use in a re-launch of the first application. In addition, also included in such embodiment(s) is a launching of a second application on the computing device.

In at least one embodiment, methods, software and apparatus are used to retrieve saved application state history information. The application state history information contains an historical snap-shot of dynamic application state information associated with a previous first application previously executing on a computing device. In addition, the embodiment(s) re-launches the previous first application on the computing device using the retrieved application state history information.

In at least one embodiment, methods, software and apparatus are used to exit a first application executing on a computing device while saving application state history information associated with the first application. A second application is launched in response to exiting the first application. In addition, the second application is exited. Saved application state history information associated with the first application is retrieved. The first application on the computing device is re-launched in response to exiting the second application. The first application is re-launched using the retrieved application state history information.

At least one embodiment includes methods, software and apparatus used to execute a first application on a computing device. A call is generated to a second application from the first application. The first application is exited in response to detecting the call to the second application. The application state history information associated with the first application is saved in response to the call to the second application. Also, the second application is launched in response to the call to the second application. The embodiment detects the termination of the second application. The saved application state history information associated with the first application is retrieved in response to detecting the termination of the second application. The embodiment(s) re-launches the first application, in response to detecting the termination of the second application, using the retrieved application state history information.

In at least one embodiment is included methods, software and apparatus using a memory, an application stored in the memory and operable to generate dynamic application state information, a runtime environment stored in the memory from which the application executes, and a processor coupled to the memory and operable to execute code to save application state history information, wherein the application state history information contains an historical snap-shot of dynamic application state information. The dynamic application state information is associated with an application currently executing on a computing device. In the embodiment(s) the application state history information is used in a subsequent re-launch of the currently running application on the computing device.

At least one embodiment includes methods, software and apparatus using a memory, an application that is stored in the memory and is operable to generate the dynamic application state information; a runtime environment from which the application executes, and a processor coupled to the memory and operable to execute code to retrieve saved application state history information. The application state history information contains an historical snap-shot of dynamic application state information associated with a previous target application wherein the previous target application was previously executing on a computing device.

At least one advantage of at least one embodiment includes providing the ability for a to support the function of exiting back to a previously running application in its pervious mode and/or state. Further, at least one advantage of at least one embodiment includes providing the ability to retain the active execution currently running program when attempting a re-launch the same application. At least one advantage of at least one embodiment includes providing the ability to maintain only a single instance of a multi-mode application on a after subsequent calls to the same application using different modes. At least one advantage of at least one embodiment includes the saving of memory and processor resources, as well as providing a better user experience, with the ability of a device having a to exit back to a previous executing application without initiating the execution of an application.

Other aspects, advantages, and features of the present invention will become apparent after review of the entire application, including the following sections: Brief Description of the Drawings, Detailed Description, and the Claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The following detailed description describes methods, software and apparatus used to execute applications on a computing device, including methods, software and apparatus, for controlling the execution of applications on a computing device using application state history information. In one or more embodiments, the computing device has an embedded controller and limited resources (i.e., limited memory capacity, a display area and file system space), and the computing device operates to utilize application state history information in controlling the execution of resident applications.

In one or more embodiments, the system used to execute applications on the computing device interacts with a runtime environment executing on the computing device that is used to simplify operation of the device, such as by providing generalized calls for device specific resources. One such runtime environment is the Binary Runtime Environment for Wireless® (BREW™) software platform developed by QUALCOMM, Inc., of San Diego, Calif. In the following description, it will be assumed that the system used to execute applications on the computing device is implemented on a portable device executing a runtime environment, such as the BREW software platform. However, one or more embodiments of the system used to execute applications on the computing device are suitable for use with other types of runtime environments to control the execution of applications on computing devices.

Figure 1:
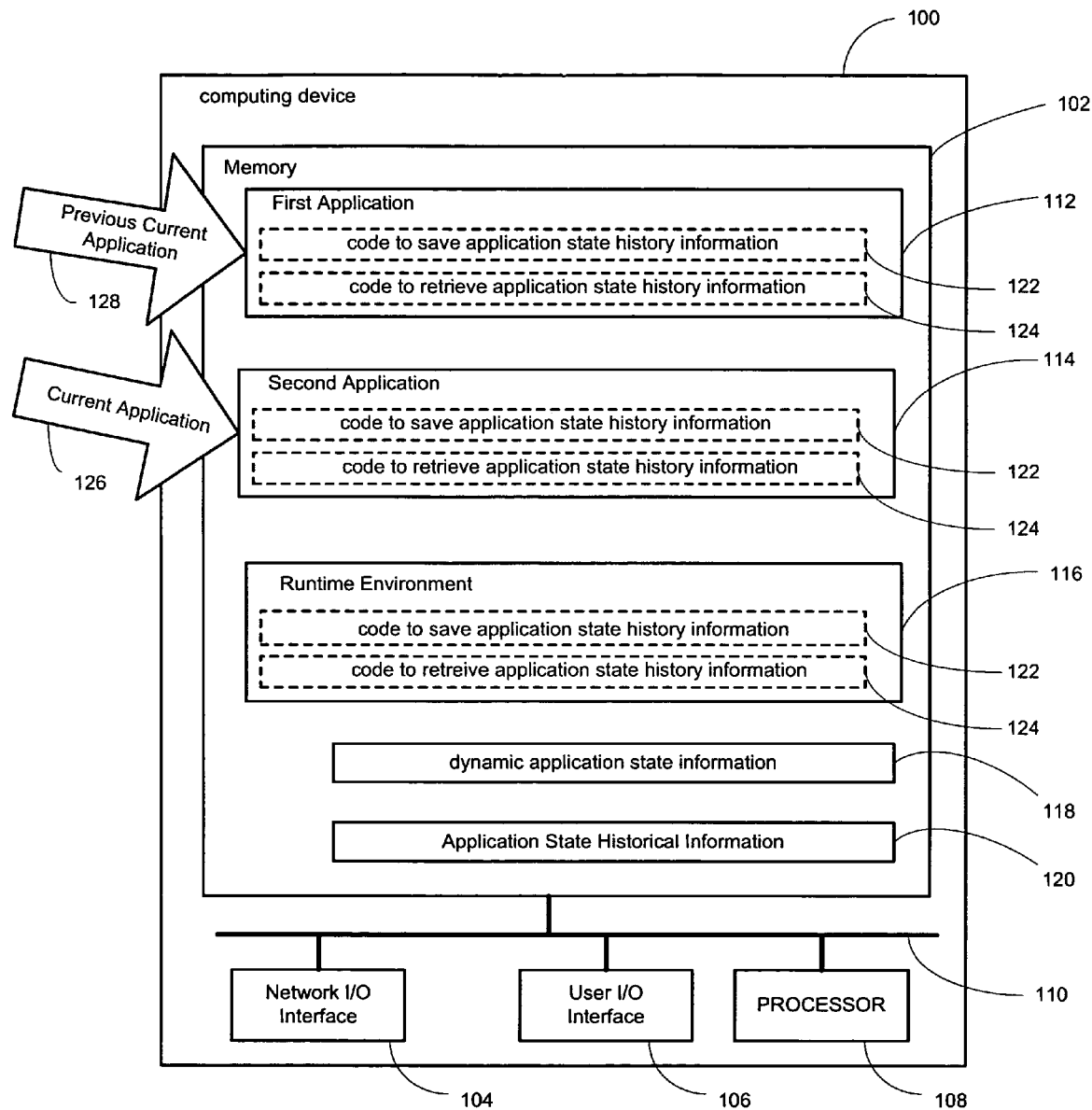
FIG. 1 shows one embodiment of a computing device for executing applications using application state history information

FIG. 1 illustrates one exemplary embodiment of a computing device 100. As used herein "computing device" includes: one or more processing circuits executing software modules stored in memory, such as microprocessors, digital signal processors (DSPs), microcontrollers, portable wireless telephones, personal digital assistants (PDAs), and paging devices, or any suitable combination of hardware, software stored in memory and/or firmware wherein an application is maintained. The device includes a memory 102, network I/O interface 104, user I/O interface 106, processor 108 and bus 110. Although the memory 102 is shown as one contiguous unit of RAM, other embodiments use multiple locations and multiple types of memory as memory 102. The network I/O interface 104 provides input and output to all devices connected to the network via the bus 110. The User I/O interface 106 provides input and output to the user of the computing device 100. The processor 108 operates on instructions and data provided via the bus 110.

Located within memory 102 is a first application 112, second application 114, runtime environment 116, dynamic application state information 118 and application state historical information 120. The first application 112 and second application 114 represent any applications that are compatible with computing device 100 and are capable of interaction with the runtime environment 116. As mentioned above, the runtime environment 116 executes on the computing device to simplify operation of the device, such as by providing generalized calls for device specific resources. Although the runtime environment shown is BREW™, other runtime environments 116 providing similar functionality are used in other exemplary embodiments.

The dynamic application state information 118 includes all or part of the information used when executing applications on such a device. The dynamic application state information 118 is data that is capable of being updated or changed during the execution of an application. Such dynamic application state information 118 may include any one or more of: a specific application identifier, application mode information, user interface data information, and other like information that may be stored in variables, registers as well as other storage data structures.

The application identifier includes information uniquely identifying a specific application. Therefore, typically each application identifier would represent a unique set of application code. However, in one exemplary embodiment, applications with the same code are given separate application identifiers such that the applications are treated as being wholly unrelated to one another by the system.

The application mode information represents, for example, different and distinct functional aspects of the same application, (e.g., a compose mode, and a read new mail mode of an email program), where display and/or the functional operation of the application differs significantly between different parts of the same application. A previous application mode is an application mode that has been previously suspended due to, or in anticipation of, for example, a call from a first application 112 to a second application 114. Typically, the previous mode contents are stored to application history for use on a subsequent re-launch of the first application upon return from the second application.

The user interface data information represents, for example, almost any data generated or used by the application that impacts the potential execution thereof. One example of relatively important user interface data information includes the information stored in conjunction with a browser application which includes a list of links representing web pages that were previously visited by the browser application. Such information is relatively important in that it significantly impacts the use of the program, e.g., forward and backward links are generally known to be a relatively heavily used, and relatively invaluable feature attributed to most browsers. Another example of user interface data information includes a list location marker such that an application may be restarted displaying the same list, and at the same location within the list. As such, user interface data information may include any variety of information that would otherwise be lost upon exiting an application and that may be deemed worthwhile to have automatically loaded upon a re-execution of the corresponding application.

The application state historical information 120 contains the type of information available in the dynamic application state information 118. As such, the application state history information 120 represents the dynamic application state information 118 as were present at specific earlier point in time. As such the application state history information 118 reflects stale dynamic application state information 118 from a previous point in time. Although such information is historical, that does not mean that such information is not equal to the current state of the device, but rather simply represents an historical snap-shot reflecting the state of the dynamic application state information 118 at a prior time after which the device has been generally free to change such values.

As shown, the first application 112, the second application 114 and the runtime environment 116 each contain an optional set of code including both code 122 to save application state history information 120 and code 124 to retrieve application state history information 120. Although such code is shown to optionally exist in each of such applications and the run time environment, multiple exemplary embodiments include locating such code in any combination across such applications and the runtime environment. For example, in one embodiment the runtime environment 116 contains a module that is called by both code 122 to save application state history information 120 and code 124 to retrieve application state history information 120 from both the first and second applications 112 and 114. What is typically important is that code exists in at least one location and that such code perform both the saving and the retrieving such that the application state history information 120 can be used to control the re-execution of a previously running application.

Finally, also shown are current application indicator 126 and previous current application indicator 127. At the corresponding time frame, for example, the second application 114 is current while the first application 112 is the previously current application. As discussed above, because the computing device 100 only allows one application to be current at any point in time, only one application (i.e., the second application 114) can be correctly indicated as being the current application at any one point in time.

Figure 2:
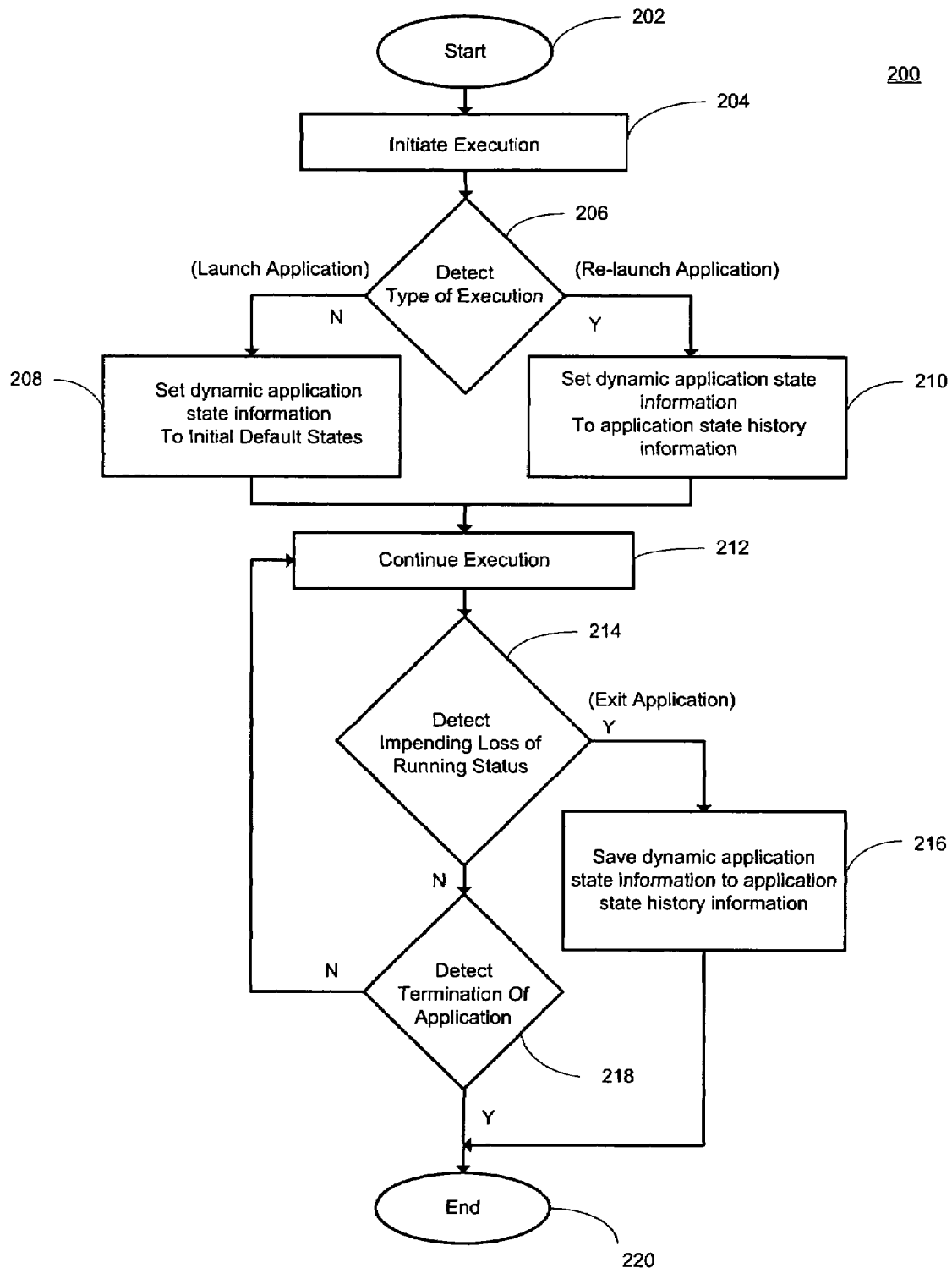
FIG. 2 shows one embodiment of a flow chart reflecting a method of executing applications on a computing device using application state history information.

FIG. 2 illustrates one exemplary embodiment 200 of a flowchart for executing applications on a computing device. Specifically, FIG. 2 describes the use of application state history information 120 in executing such applications. The process begins at step 202 where initial execution of the application begins. Generally the initial execution of an application may be considered to be the detection of an upcoming call to such application or the actual execution of instructions within the application itself.

Following the initial execution of the application at step 202 is the detection of the type of execution at step 206. Here, a determination is made as to whether the execution is a "launch" or a "re-launch," where a "launch" represents an initial call to an application that has not yet been exited, and a "re-launch" represents a subsequent call to an application based on the a return from an exit from a subsequently exited program. In other words, if a call to an application occurs due to a backward return from a previous application, such action is a "re-launch" while a forward call from another application represents a "launch."

If a launch is detected then the process continues to set dynamic application state information 118 to initial default settings at step 208. Here the data application is set to start from an initial state that does not reflect any previous state history of such application. If however, a re-launch is detected then the process instead continues to set dynamic application state information 118 to the corresponding application state history information 120 at step 210 such that the application is initialized to a previous state of the application reflecting settings present when the application was previously exited. However, other embodiments, on re-launch, assign or set dynamic application state information 118 to data other than that present upon the earlier exiting of the application, such as when an application is always initialized to initial settings. Following launch or re-launch steps 208 and 210 is the step of continuing execution of the application at step 212.

The application continues to execute in step 212 while the application is monitored to either detect the impending loss of running status of the application at step 214 or to detect the termination of the application at step 218. Similar to the detection of launch or re-launch, such detections can occur either within the application itself or outside thereof. In one embodiment the detection of the impending loss of running status is detected via computer instructions associated with a call-type command that invokes a call to another application. In another embodiment the detection occurs outside of the current application such as the runtime environment or the called application or other like location. Further, one embodiment detects the termination of the application via code associated with an exit-type instruction within the application. However, other embodiments detect such termination in the runtime environment or in a returned-to application or other like location. In one embodiment the system notifies the application of the impending loss of running status.

If there is a detection of the impending loss of running status at step 214, then the dynamic application state information 118 is saved to the application state history information 120 at step 216. Following such a save of the dynamic application state information 118 in step 216 or the detection of the termination of the application in step 218, is the end of the process at step 220.

Figure 3:
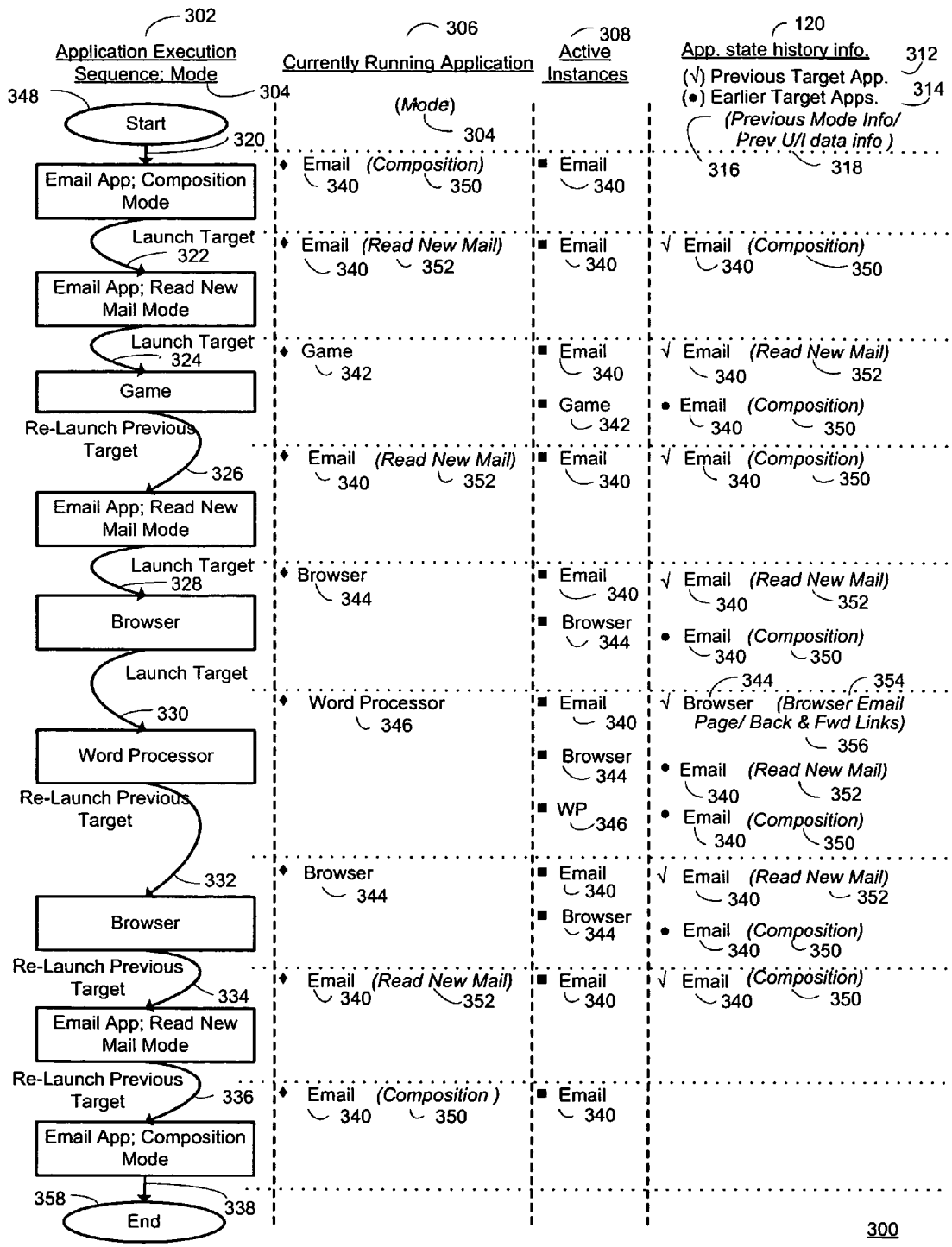
FIG. 3 shows one embodiment of a data table reflecting a method of executing applications on a computing device including the step-by-step contents of exemplary dynamic application state information

FIG. 3 illustrates one exemplary embodiment 300 of the computing device 100 in the form of a table displaying the inter-relationships between application calls and system related information. The system related information is shown in four columns: in col. 1 is an application execution sequence 302 with associated application modes 304, in col. 2 is the currently running application 306 and corresponding application mode 304, in col. 3 are the active instances 308 and in col. 4 is the application state history information 120 including previous target application 312, earlier target applications, previous mode information and previous user interface data information 318. Further, the rows of the table reflect the different states corresponding to the different application calls and returns (320, 322, 324, 326, 328, 330, 332, 334, 336 and 338), or launches and re-launches, to and from the different target application 340, 342, 344 and 346.

As shown, the process begins at node 348 where the call to the email application 340 is initiated in the "composition" mode 350. As a result, the currently running application 306 becomes the email application 340 and the current application mode 304 becomes the "composition" mode 350. The active instances 308 now includes email application 340 while application state history information 120 remains empty.

Next, the currently running application 306 (email 34) makes a call 322 to launch as the same target application of the email application 340, but with the new mode of "read new mail" 352. This would occur, for example, when a user is attempting to compose a new email to send, but while in such process then receives a new mail message. In one embodiment, the system detects a call to the same application, and in response, maintains the email application 340 as the current running application 306. As a result, the only active instance 308 remains as the previous email application 340. However, with the exiting of the email application 340 in the "composition" mode 350, the system updates application state history information 120 with the application identifier (email application 340) as well as with the application mode ("composition" 350).

Next, currently running application 306, (email application 340) makes a call 324 to launch the target application (game application 342). This may occur, for example, where the email application 340, while in the read new mail mode 352, displays an email message containing a link to the game application 342, and where the user then chooses to execute the game application 342. In response, a new active instance for the game application 342 is added to the already active instance for the email application 340. In addition, the application state history information 120 is populated with a previous target application 312 (email application 340) as well as the previous mode information ("read new mail" 352).

While running the game application 342, the user, for example, requests to cancel the execution of the current game application 342, as a result, the call 326 is executed to re-launch the previous target application 312, (email application 340) using the previous mode information 316, ("read new mail" mode 352). The currently running application 306 is set to the email application 340 with the current mode of "read new mail" 352. The game application 342 is removed as an active instance 308 leaving the email application 340 as the only currently active instance 308. Also, the application state history information 120 is updated by removing of the previous target application 312 (email) including previous mode information 316 ("read new mail").

Next, back in the email application 340 in the "read new mail" mode 352, the user, for example, might choose to read an email including an executable icon for a browser application 344. The user then, for example, might execute the link to the browser application 344 to begin its execution. In one embodiment, for example, upon execution, the browser initializes itself with a default home application of a browser email page. The currently running application 306 becomes the browser application 344 and the active instances 308 is expanded to include the browser application 344. Also, the application state history information 120 is updated to include a new entry for the email application 340 along with the application mode of "read new mail" 352.

In one embodiment, the browser application 344 executes an email page, where a user reads an email containing a word processor document. The user might then open the document, and in so doing, initiate a launch to a target application 330 where the associated word processor application 346 may begin execution. When initiated, the active instances 308 receive a new entry of the word processor application 346. Also, the application state history information 120 is updated to include a new entry for the browser application 344 along with user interface data information including information identifying the browser email page 354 and any backward and forward links 356 associated with the browser application 344.

Operating from within the word processor application 346, an exit is detected by the system. Detecting the exit, the system executes return call 332 which re-launches the previous target application 312 (containing a reference to the browser application 344) using the previous user interface data information 318 such that the browser application 344 is executed and initialized to a web page that is the browser email page 354, and where the associated browser links are set to the corresponding backward and forward links 356 saved earlier. The currently running application 306 becomes the browser application 344. The currently active instances 308 has the word processing application 346 removed. Also, the application state history information 120 is updated with the removal of the previous target application 312 (browser) including previous U/I data information 318 (browser email page & backward and forward links).

Now executing the browser application 344 the system may detect an exit therefrom. Detecting the exit, the system executes return call 334 which re-launches the previous target application 312 (currently containing a reference to the email application 340) using the previous mode information 316 such that the email application 340 is executed in the "read new mail" mode 352. The currently running application 306 becomes the email application 340. The currently active instances 308 then experience the removal of the browser application 346. Also, the application state history information 120 is updated with the removal of the previous target application 312.

Executing the email application 340 the system may detect an exit therefrom. Detecting the exit, the system executes return call 336 which re-launches the previous target application 312 (currently containing a reference to the email application 340) using the previous mode information 316 such that the email application 340 is re-launched in the "composition" mode 352. In one embodiment, the system detects the email application as the currently running application when a re-launch of the same application is attempted, and in response, maintains such application as current while simply passing new mode information to the application. The currently running application 306 remains the email application 340 but now has an application mode of "composition" 350. The currently active instances remain unchanged. The application state history information 120 is updated with the removal of its last previous target application 312 entry.

Finally, while executing the email application 340 the system may detect a final exit therefrom. Detecting the exit, the system executes exit 338 which ends the series of nested application calls at node 358. The system is aware of the end of the nested calls, at least, because the application state history information is absent any additional entries. Upon exiting the final application there is not currently running application 306, nor are there any active instances 308.

Although not shown in FIG. 3, one exemplary embodiment provides for application launches and re-launches that are not limited to simply previous or simply next applications. For example, in one embodiment an entire list of the applications and corresponding application state history information 120 is available to the user to be selected without regard to the location within the list in which the application appears.

Figure 4:
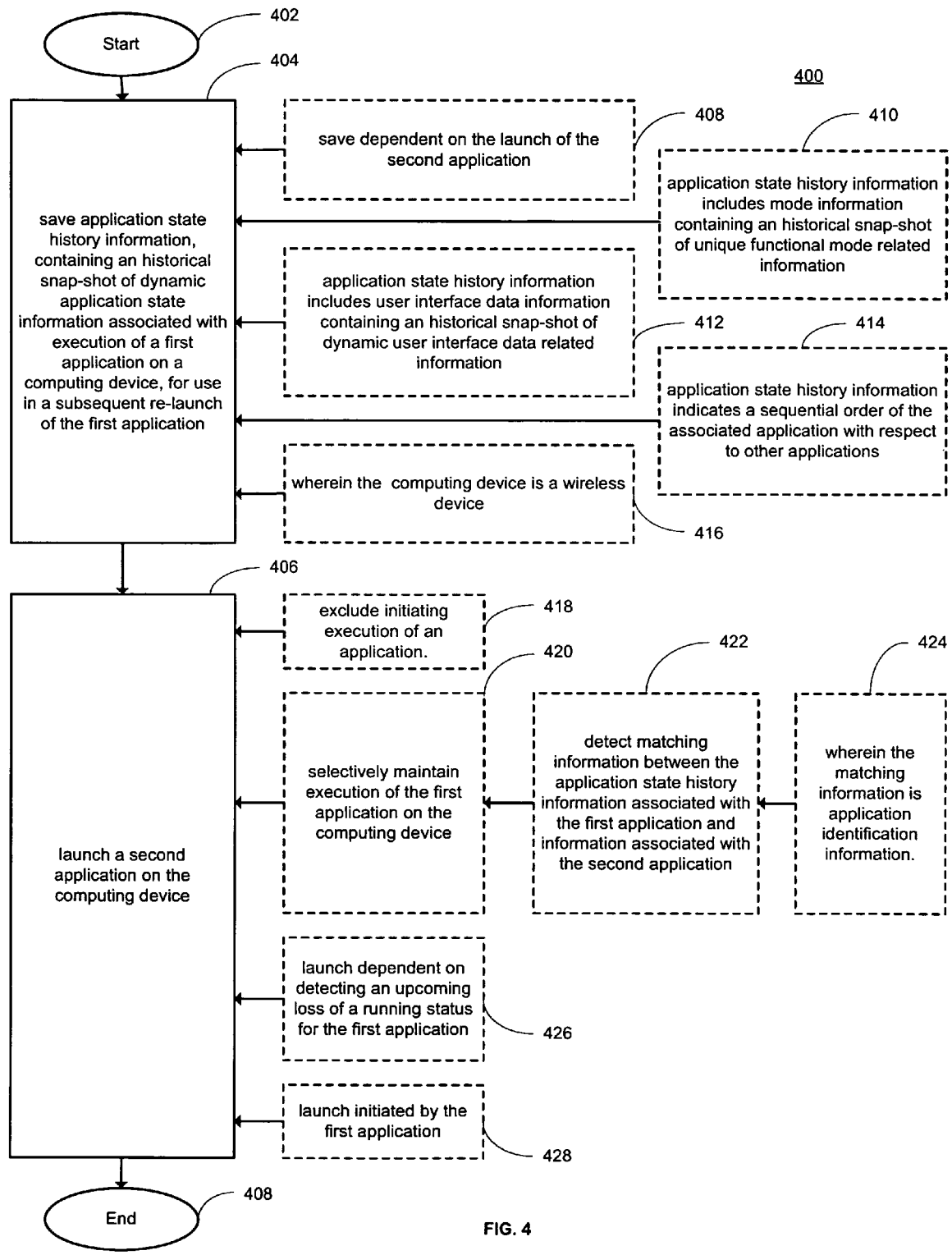
FIG. 4 shows one embodiment of a method of executing applications on a computing device including the saving of application state history information and launching a second application.

FIG. 4 illustrates one exemplary embodiment 400 of a method for executing applications on a computing device 100. Specifically, FIG. 4 describes a method where after a starting at node 402, step 404 is executed wherein the method saves application state history information 120, containing an historical snap-shot of dynamic application state information 118 associated with execution of a first application 112 on a computing device 100, for use in a subsequent re-launch of the first application 112. Following step 404 is shown step 406 in which the method launches a second application 114 on the computing device 100. Following the second step is the end of the method indicated with end node 408.

In addition FIG. 4 also shows a number of optional criteria and steps 408, 410, 412, 414, 416, 418, 420, 422, 424, 426 and 428. Specifically optional criteria and steps 408, 410, 412, 414 and 416 each modify step 404 and the remaining optional criteria and steps modify step 406. First step 404 is optionally modified (408) to save dependent on the launch of the second application 114. Step 404 is also optionally modified (410) such that application state history information 120 includes mode information 416 containing an historical snap-shot of unique functional mode related information. Step 404 is also optionally modified (412) such that application state history information 120 includes user interface data information 418 containing an historical snap-shot of dynamic user interface data related information 118. Step 404 is also optionally modified (414) such that application state history information 120 indicates a sequential order of the associated application with respect to other applications. Step 404 is also optionally modified (416) wherein the computing device 100 is a wireless device Step 406 is also optionally modified (418) to further exclude initiating execution of an application. Step 406 is also optionally modified (420) to selectively maintain execution of the first application on the computing device 100. Step 406 is also optionally modified (420 & 422) to detect matching information between the application state history information 120 associated with the first application 112 and information associated with the second application 114. Step 406 is also optionally modified (420, 422 & 424) wherein the matching information is application identification information. Step 406 is also optionally modified (426) to launch dependent on detecting an upcoming loss of a running status for the first application 112. Step 406 is also optionally modified (428) wherein the launch is initiated by the first application.

Figure 5:
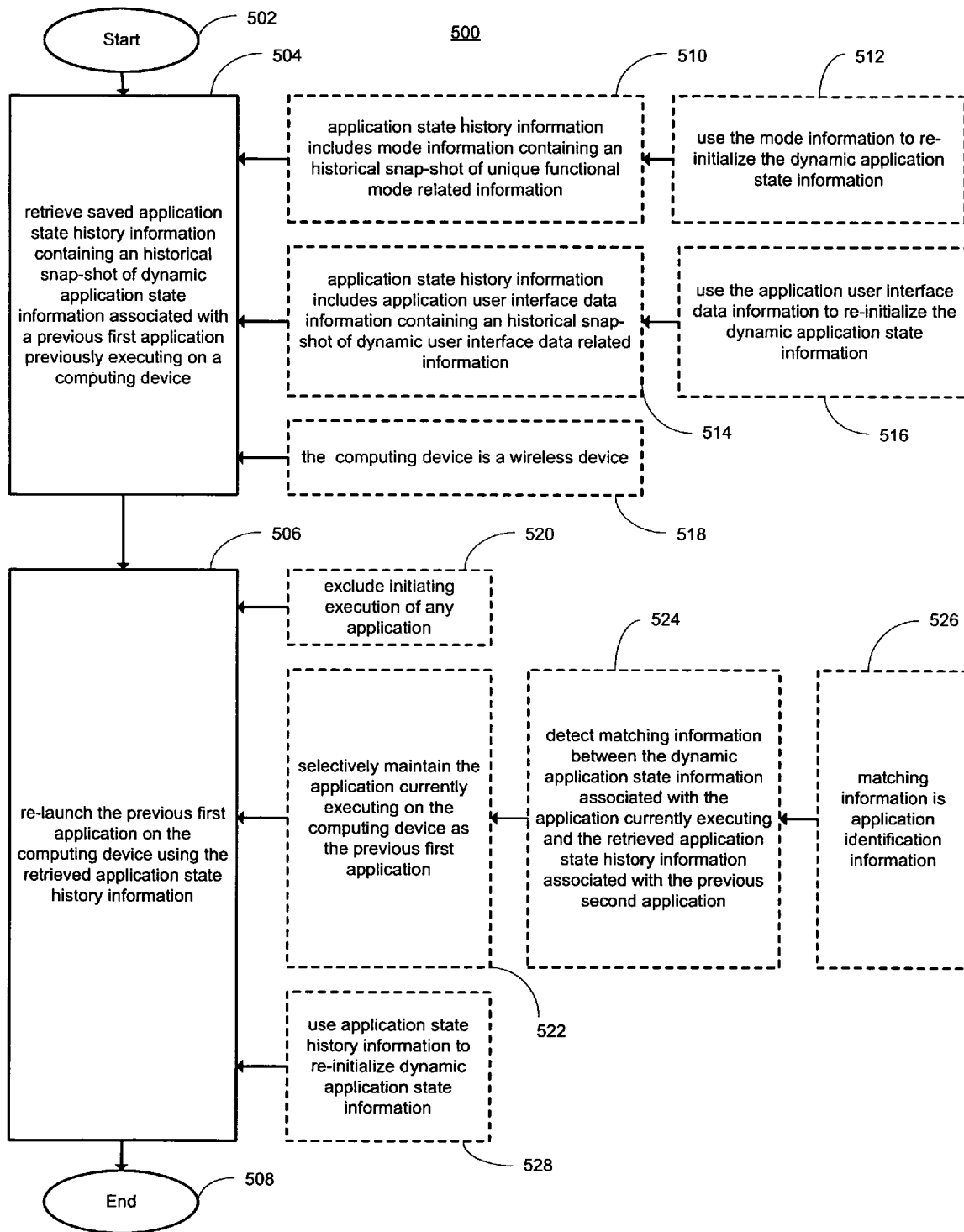
FIG. 5 shows one embodiment of a method of executing applications on a computing device including the retrieving of application state history information and re-launching a previous first application.

FIG. 5 illustrates one exemplary embodiment 500 of a method for executing applications on a computing device 100. Specifically, FIG. 5 describes a method where after a starting at node 502, step 504 is executed to retrieve saved application state history information 120 containing an historical snap-shot of dynamic application state information 118 associated with a previous first application 112 previously executing on a computing device 100. Following step 504 is step 506 in which the method re-launches the previous first application 112 on the computing device 100 using the retrieved application state history information 118. Following the second step is the end of the method indicated with end node 508.

In addition FIG. 5 also shows a number of optional criteria and steps 508, 510, 512, 514, 516, 518, 520, 522, 524, 526 and 528. Specifically optional criteria and steps 508, 510, 512, 514, 516 and 518 each modify step 504 and the remaining optional criteria and steps modify step 506. First step 504 is optionally modified (510) such that application state history information 120 includes mode information 304 containing an historical snap-shot of unique functional mode related information. Step 504 is also optionally modified (510 & 512) to use the mode information 304 to re-initialize the dynamic application state information 118. Step 504 is also optionally modified (514) such that application state history information includes application user interface data information containing an historical snap-shot of dynamic user interface data related information. Step 504 is also optionally modified (514 & 516) to use the application user interface data information to re-initialize the dynamic application state information. Step 504 is also optionally modified (518) such that the computing device 100 is a wireless device.

Step 506 is optionally modified (520) to exclude initiating execution of any application. Step 506 is also optionally modified (522) to selectively maintain the application currently executing on the computing device 100 as the previous first application 112. Step 506 is also optionally modified (522 & 524) to detect matching information between the dynamic application state information associated with the application currently executing and the retrieved application state history information associated with the previous second application. Step 506 is also optionally modified (522, 524 & 526) wherein matching information is application identification information. Step 506 is also optionally modified (528) to use application state history information 120 to re-initialize dynamic application state information 118.

Figure 6:
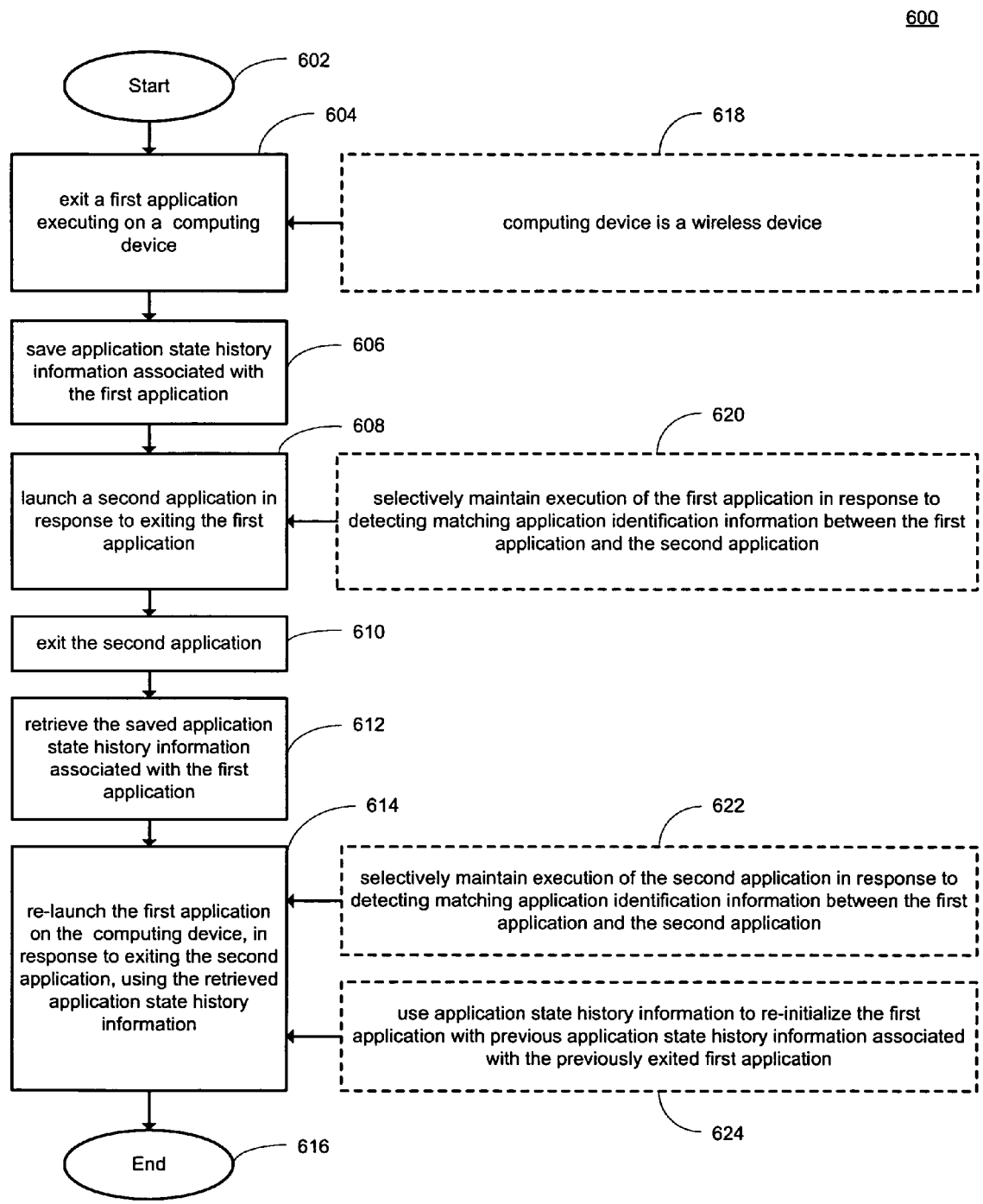
FIG. 6 shows one embodiment of a method of executing applications on a computing device using application state history information.

FIG. 6 illustrates one exemplary embodiment 600 of a method for executing applications on a computing device 100. Specifically, FIG. 6 describes a method where after a starting at node 602, step 604 is executed to exit a first application 112 executing on a computing device 100. Following step 604 is step 606 in which the method saves application state history information 120 associated with the first application 112.

In one embodiment, its only when a first application 112 calls a second application 114 that the application state history information 120 is actually saved (i.e., no "back" history is needed until a nested call has occurred). However, in other embodiments, an application can anticipate the need to save such information (i.e., not waiting until the first application 112 has called a second application 114 before populating the application state history information 120 with previous target application information 312), before a call is made to the second application 114—although such a scenario represents is a less efficient approach, as it requires the use of memory and processing time that may have been unnecessary.

Following step 606 is step 608 in which the method launches a second application 114 in response to exiting the first application 112. Following step 608 is step 610 in which the method exits the second application 114. Following step 610 is step 612 in which the method retrieves the saved application state history information 120 associated with the first application 112. Following step 612 is step 614 in which the method re-launches the first application 112 on the computing device 100, in response to exiting the second application 114, using the retrieved application state history information 120. Following step 614 is end node 616 which represents the end of the method.

Three of the steps 604, 608 and 614 are optionally modified by four additional limitations 618, 620, 622 and 624. Step 604 is optionally modified (618) such that the computing device 100 is a wireless device. Step 608 is optionally modified (620) to selectively maintain execution of the first application 112 in response to detecting matching application identification information between the first application 112 and the second application 114. Step 614 is optionally modified (622) to selectively maintain execution of the second application 112 in response to detecting matching application identification information between the first application 112 and the second application 114. Step 614 is also optionally modified (624) to use application state history information 120 to re-initialize the first application 112 with previous application state history information 312 associated with the previously exited first application 112.

Figure 7:
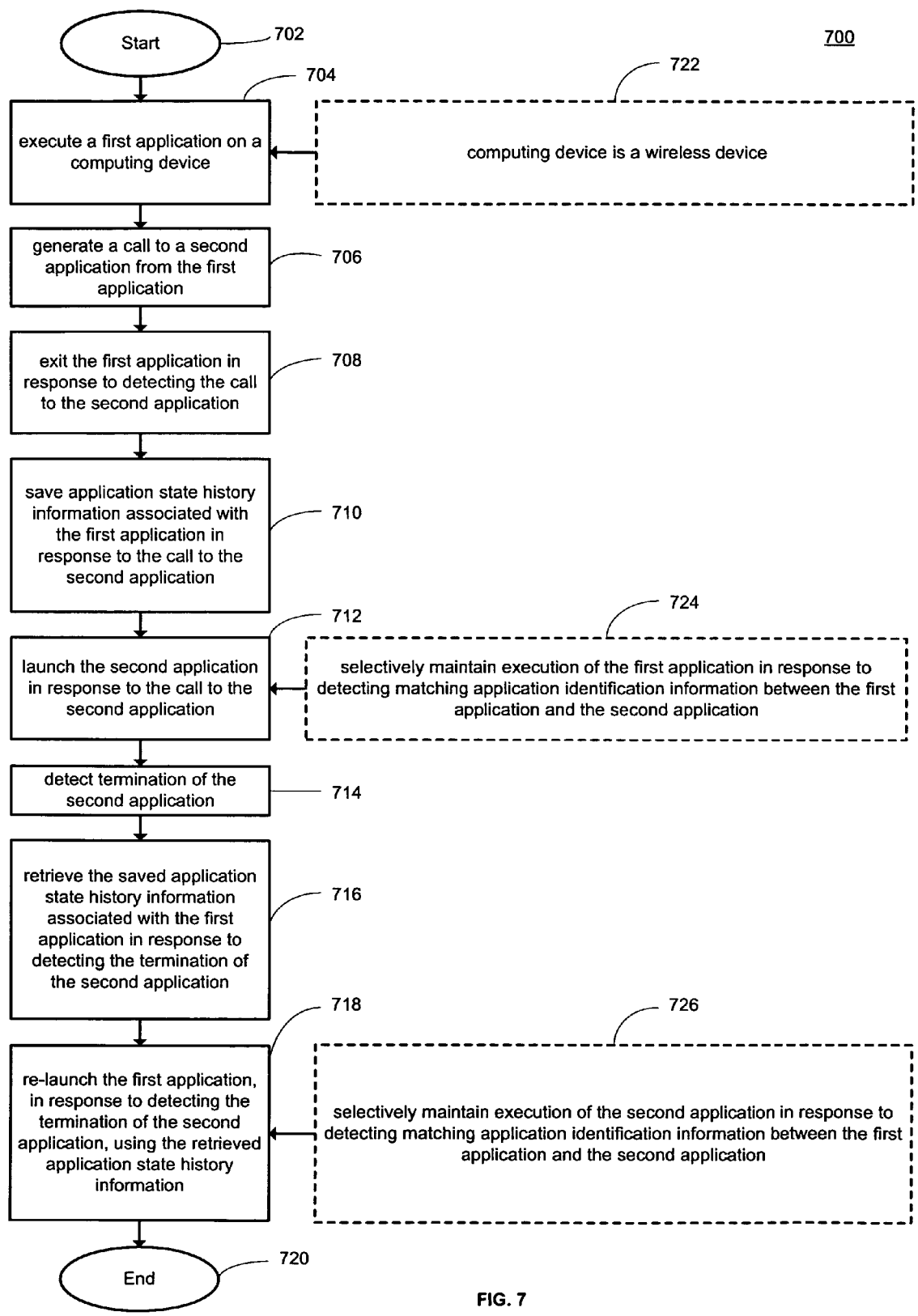
FIG. 7 shows one embodiment of a method of executing applications on a computing device using application state history information.

FIG. 7 illustrates one exemplary embodiment 700 of a method for executing applications on a computing device 100. Specifically, FIG. 7 describes a method where after a starting at node 702, step 704 is executed to execute a first application 112 on a computing device 100. Following step 704 is step 706 in which the method generates a call to a second application 114 from the first application 112. Following step 706 is step 708 in which the method exits the first application 112 in response to detecting the call to the second application 114. Following step 708 is step 710 in which the method saves application state history information 120 associated with the first application 112 in response to the call to the second application 114. Following step 710 is step 712 in which the method launches the second application 114 in response to the call to the second application 114. Following step 712 is step 714 in which the method detects termination of the second application 114. Following step 714 is step 716 in which the method retrieves the saved application state history information 120 associated with the first application 112 in response to detecting the termination of the second application 114. Following step 716 is step 718 in which the method re-launches the first application 112, in response to detecting the termination of the second application 114, using the retrieved application state history information 120. Following step 718 is end node 720 which represents the end of the method.

Three of the steps 704, 712 and 718 are optionally modified by three additional limitations 722, 724 and 726. Step 704 is optionally modified (722) such that the computing device 100 is a wireless device. Step 712 is optionally modified (724) to selectively maintain execution of the first application 112 in response to detecting matching application identification information between the first application 112 and the second application 114. Step 718 is optionally modified (726) to selectively maintain execution of the second application 114 in response to detecting matching application identification information between the first application 112 and the second application 114.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of executing a plurality of applications on a computing device, comprising:
   detecting a call or request for the execution of a first application of the plurality of applications;
   determining whether the execution is for a backward return or forward call, wherein if the execution is for a backward return;
   initializing the first application to a previously saved state history using first application stare store, wherein the first application state store contains historical snap-shot or dynamically application state information associated with the execution of the first application;
   monitoring the execution of the first application for impending loss or termination, and wherein in the event of an impending loss or termination;
   saving a first application state information into the first application state store;
   launching a second application of the plurality of applications on the computing device and excluding execution of any application other than the second application, wherein upon an impeding loss or termination of the second application;
   saving a second application state information;
   launching a third application of the plurality of applications on the computing device, wherein upon termination of the third application, restoring the second application based on the second application state information; and
   upon the termination of the second application, restoring the first application based on the first application state information.

2. The method of claim 1, further comprising detecting matching information between the first application state information and the second application state information.

3. The method of claim 2, wherein the matching information comprises application identification information.

4. The method of claim 1, wherein the first application state information comprises mode information containing an historical snap-shot of unique functional mode related information.

5. The method of claim 1, wherein the first application state information comprises user interface data information containing an historical snap-shot of dynamic user interface data related information.

6. The method of claim 1, wherein the first application state information indicates a sequential order of the associated application with respect to other applications.

7. The method of claim 1, wherein the launching of the second application is initiated by the first application.

8. The method of claim 1, wherein the computing device comprises a wireless device.

9. A computing device comprising:
   a memory;
   an application stored in the memory and operable to generate the dynamic application state information;
   a runtime environment stored in the memory from which the application executes; and
   a processor coupled to the memory and operable to execute code to:
   detecting a call or request for the execution of a first application of the plurality of applications;
   determining whether the execution is for a backward return or forward call, wherein if the execution is for a backward return;
   initializing the first application to a previously saved state history using first application stare store, wherein the first application state store contains historical snap-shot or dynamically application state information associated with the execution of the first application;
   monitoring the execution of the first application for impending loss or termination, wherein in the event of an impending loss or termination;
   saving a first application state information into the first application state store;
   launching a second application of the plurality of applications on the computing device and excluding execution of any application other than the second application, wherein upon an impeding loss or termination of the second application;
   saving a second application state information;
   launching a third application of the plurality of applications on the computing device, wherein upon termination of the third application;
   restoring the second application based on the second application information; and
   upon the termination of the second application, restoring the first application based on the first application state information.

10. The method of claim 9, wherein the computing device comprises a wireless device.

11. A computer readable medium including at least one set of instructions stored thereon that may be utilized by at least one processor to save, application history information, the computer readable medium storing:

a set of instructions for detecting a call or request for the execution of a first application of the plurality of applications;

a set of instructions for determining whether the execution is for a backward return or forward call, wherein if the execution is for a backward return;

a set of instructions for initializing the first application to a previously saved state history using first application stare store, wherein the first application state store contains historical snap-shot or dynamically application state information associated with the execution of the first application;

a set of instructions for monitoring the execution of the first application for impending loss or termination, wherein in the event of an impending loss or termination;

a set of instructions for saving a first application state information into the first application state store;

a set of instructions for launching a second application of the plurality of applications on the computing device and excluding execution of any application other than the second application, wherein upon an impeding loss or termination of the second application;

a set of instructions for saving a second application state information;

a set of instructions for launching a third application of the plurality of applications on the computing device, wherein upon termination of the third application;

a set of instructions for restoring the second application based on the second application information; and upon the termination of the second application, a set of instructions for restoring the first application based on the first application state information.

12. A computing device, comprising:

processor;

memory;

means for detecting a call or request for the execution of a first application of the plurality of applications;

means for determining whether the execution is for a backward return or forward call, wherein if the execution is for a backward return;

means for initializing the first application to a previously saved state history using first application stare store, wherein the first application state store contains historical snap-shot or dynamically application state information associated with the execution of the first application;

means for monitoring the execution of the first application for impending loss or termination, wherein in the event of an impending loss or termination;

means for saving a first application state information into the first application state store;

means for launching a second application of the plurality of applications on the computing device and excluding execution of any application other than the second application, wherein upon an impeding loss or termination of the second application;

means for saving a second application state information;

means for launching a third application of the plurality of applications on the computing device, wherein upon termination of the third application;

means for restoring the second application based on the second application information; and upon the termination of the second application, means for restoring the first application based on the first application state information.

* * * * *